United States Patent
Takahashi

4,154,509
May 15, 1979

[54] MINIATURIZED SEMI-WIDE-ANGLE PHOTOGRAPHIC LENS

[75] Inventor: Yasuo Takahashi, Tokyo, Japan

[73] Assignee: Asahi Kogaku Kogyo Kabushiki Kaisha, Tokyo, Japan

[21] Appl. No.: 831,207

[22] Filed: Sep. 7, 1977

[30] Foreign Application Priority Data

Sep. 9, 1976 [JP] Japan ................... 51-108226

[51] Int. Cl.² ............................................. G02B 9/34
[52] U.S. Cl. ............................................. 350/220
[58] Field of Search .................................. 350/220

[56] References Cited

U.S. PATENT DOCUMENTS

| | | | |
|---|---|---|---|
| 2,587,347 | 11/1948 | Lowenthal | 350/220 |
| 3,011,401 | 9/1958 | Sandback | 350/220 |
| 3,011,402 | 12/1958 | Johnson | 350/220 |
| 4,093,348 | 6/1978 | Yasukuni | 350/220 |

*Primary Examiner*—Conrad J. Clark
*Attorney, Agent, or Firm*—Sughrue, Rothwell, Mion, Zinn and Macpeak

[57] ABSTRACT

A miniaturized semi-wide-angle photographic lens having a field of view angle of from ±27° to ±28° is composed of five lenses grouped in four lens components. In order from the object side to the image side, the first lens is a positive lens having its surface of greater curvature toward the object, and the second lens is a double concave lens. The third lens and the fourth lens are respectively a negative lens and a positive lens, both of which constitute a cemented doublet lens. The fifth lens is a positive meniscus lens having its surface of greater curvature toward the image.

1 Claim, 2 Drawing Figures

MINIATURIZED SEMI-WIDE-ANGLE PHOTOGRAPHIC LENS

BACKGROUND OF THE INVENTION

Recently, there has been a trend toward miniaturization of single reflex cameras and this trend is especially evident in new photographic lens systems.

This invention relates to a miniaturized semi-wide-angle photographic lens which is characterized by a compact overall length of the lens system. Generally, the angle of view of the so-called standard or normal lens is on the order of from ±20° to ±23°. However, the use of a semi-wide-anglelens is more appropriate in general photography in comparison with the standard lens. When an angle of view of more than ±30° is used in a lens for a single lens reflex camera, it is necessary for the back focal length to be relatively long with the result that the overall length of the lens system becomes longer. Therefore, this invention aims at the miniaturization of a photographic lens having an angle of view in the intermediate range between the standard and the wide-angle, and in particular relates to a photographic lens having an angle of view of from ±27° to ±28°.

SUMMARY OF THE INVENTION

According to the present invention, a semi-wide-angle photographic lens having an angle of view of from ±27° to ±28° and a short overall length is composed of five lenses grouped in four lens components. In order from the object side to the image side, the first lens is a positive lens having its surface of greater curvature toward the object, the second lens is a double concave lens, the third and fourth lenses are respectively a negative lens and a positive lens and together constitute a cemented doublet, and the fifth lens is a positive lens having its surface of greater curvature toward the image.

DETAILED DESCRIPTION OF THE INVENTION

Figure 1:
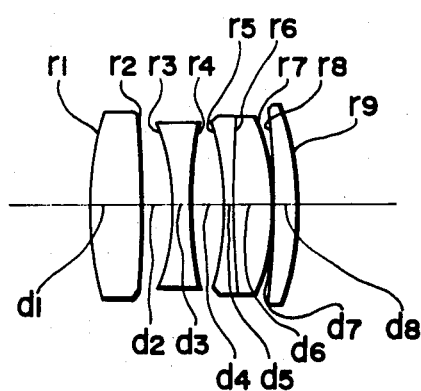
FIG. 1 is a simplified cross-sectional view of the lens system according to the invention.
Figure 2:
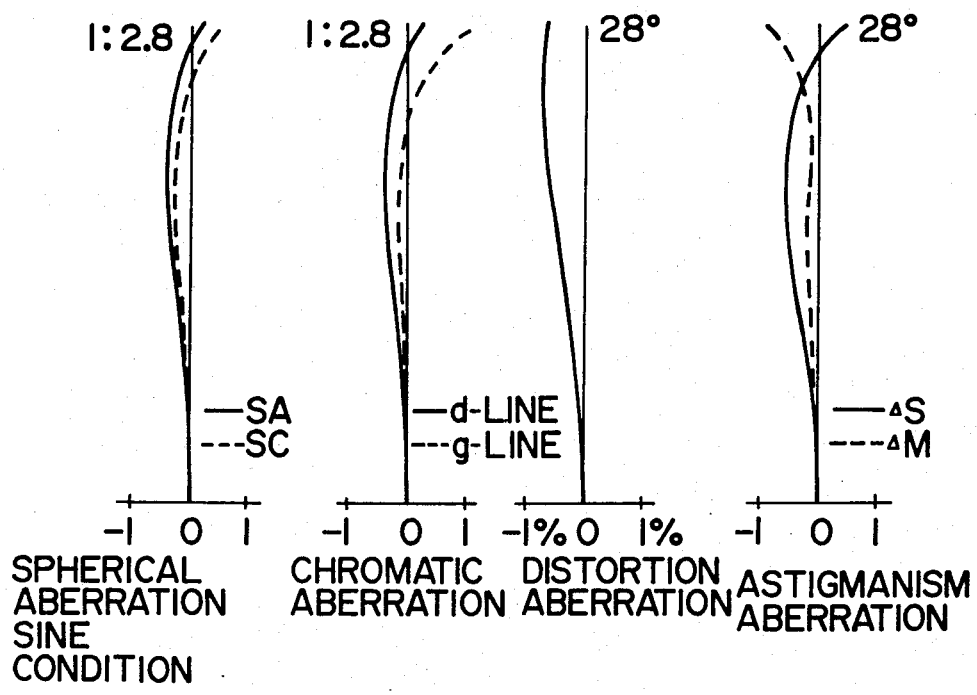
FIGS. 2A, 2B, 2C and 2D are graphs showing aberration curves obtained with a specific embodiment of the invention.

The semi-wide-angle photographic lens according to the present invention as shown in FIG. 1 is composed of five lenses grouped in four lens components. In order from the object to the image side, the first lens is a positive lens having its surface of greater curvature toward the object, and the second lens is a double concave lens. The third lens and the fourth lens are respectively a negative lens and a positive lens, both of which constitute a cemented doublet lens. The fifth lens is a positive meniscus lens having its surface of greater curvature toward the image.

The semi-wide-angle photographic lens according to the present invention is characterized by the following ten conditions as noted below:

(1) $n_1 \cdot n_4 \cdot n_5 > 1.75$
(2) $n_2 < 1.82$, $n_3 > 1.65$
(3) $F/1.65 < F_1 < F/1.25$
(4) $F/0.4 < |F_{1,2}| < F/0.29$, $F_{1,2} < 0$
(5) $0.45F < |r_3| < 0.7F$, $r_3 < 0$
(6) $0.55F < r_1 < 0.85F$
(7) $0.35F < l < 0.6F$
(8) $|r_8| > 2F$
(9) $0.04F < d_2 < 0.1F$
(10) $0.22F < (d_1 + d_2 + d_3 + d_4) < 0.32F$ wherein F is the focal distance of the overall lens system, $F_{1,2,...i}$ is the composite focal distance of the first through the i-th lenses, $r_j$ is the radius of curvature of the j-th surface, $n_i$ is the refractive index for d-line of the i-th lens, $d_k$ is the k-th spacing or lens thickness, and l is the overall length of the lens system.

Now the features of the lens of this invention as described above will be described in detail.

Condition (1) is provided to decrease the amount of the aberration over the wide-angle field of view. It is necessary to increase the value of $n_1$ in order to cover the wide-angle whereby the radius of curvature of the second surface is desirably either positive or extremely negative. Therefore, the refractive index must be large. When the refractive index is smaller than 1.75, the coma aberration for light of the wide-angle field of view is remarkably deteriorated. When $n_4 \cdot n_5$ is smaller than 1.75, the lens system has a brightness or f number of 1:2.8 but the spherical aberration is deteriorated. In order to decrease the amount of the spherical aberration, it becomes necessary to make $n_3$ smaller than 1.65 but this results in a deterioration of the balance in the coma aberration and a decrease in Petzval's sum.

Condition (2) is provided to maintain the suitable Petzval's sum by placing the refractive index of the negative lens within the range covered by the condition and moreover, in association with condition (1), to maintain a suitable balance in the astigmatism within the wide-angle field of view according to the present invention. When the refractive index of the negative lens is larger than 1.82, the Petzval's sum is increased. In contrast, when the refractive index of the negative lens is smaller than 1.65, the Petzval's sum decreases extremely thus making it difficult to maintain a balance in the aberration in the wide-angle field of view.

Condition (3) is provided to obtain te desired refractive power in the second surface in association with $n_1$ in condition (1) and simultaneously shows a certain range of the focal length of the first lens in order to maintain the balance in the chromatic aberration. When $F_1$ is smaller than F/1.65, the radius of curvature in the second surface, which is negative, tends to decrease, and this leads to a deterioration of the coma aberration in the wide-angle field of view and a further disadvantage of elongating the back focal length. In contrast, when $F_1$ is larger than F/1.25, the distortion is increased and the occurrence of inside coma is promoted whereby the total coma aberration is deteriorated.

Condition (4) is most important in association with condition (3) and is provided to obtain a suitable Petzval's sum and a suitable chromatic aberration. When $F_{1,2}$ is negative and $|F_{1,2}|$ is smaller than F/0.4, the Petzval's sum is decreased and the coma aberration in the fourth surface is deteriorated. In contrast, when $|F_{1,2}|$ is larger than F/0.29, negative distortion increases.

Condition (5) is provided to compensate for the negative spherical aberration in association with conditions (3) and (4). When $r_3$ is negative and $|r_3|$ is smaller than 0.45F, the negative spherical aberration increases with the result that it becomes necessary to compensate in another portion of the lens system and the balance in the coma aberration is impaired. In contrast, when $|r_3|$ is larger than 0.7F, it becomes difficult to remove the positive spherical aberration. Even if the burden placed on the seventh and ninth surfaces is decreased by making the radius of curvature in the fifth and eighth surfaces to be positive, negative distortion increases and the outside coma aberration is deteriorated.

Condition (6) determines the burden placed on the second surface with respect to the refractive power in association with conditions (3) and (4). When $r_1$ is smaller than 0.55F, it is possible to compensate for some drawbacks in the second surface with increasing angle of view but this results in a deterioration of the negative distortion and the inside coma. In contrast, when $r_1$ is larger than 0.85F, it becomes difficult to increase the angle of view.

Condition (7) is required for miniaturization of the lens system. When l is larger than 0.6F, it is necessary to increase the diameter of the first lens or the fourth and fifth lenses in order to prevent a decrease of the amount of light for the peripheral area, thus reversing the object of minimizing the lens diameter. In contrast, when l is smaller than 0.35F, in association with conditions (3) and (4), the Petzval's sum is increased and the thickness of the lens is decreased thereby decreasing the edge thickness of the lens. Thus, it becomes impossible to obtain a lens having an f number of 1:2.8.

Condition (8) is provided to prevent an increase of the negative distortion, a deterioration of the coma aberration and an insufficient compensation of the spherical aberration. When $r_8$ is positive and $|r_8|$ is smaller than 2F, the negative distortion is increased and the coma aberration is deteriorated due to the occurrence of the inside coma. In contrast, when $r_8$ is negative and $|r_8|$ is smaller than 2F, the burden of compensation is increased in the ninth surface and this leads to an insufficient compensation for the spherical aberration.

Condition (9) is provided to maintain the back focal length and the Petzval's sum under suitable conditions in association with condition (3). When $d_2$ is shorter than 0.04F, it is advantageous for elongating the back focal length but this results in a increase in the Petzval's sum and consequently the astigmatism is deteriorated. In contrast, when $d_2$ is longer than 0.1F, it becomes possible to decrease the Petzval's sum which is advantageous for other conditions, but it become difficult to elongate the back focal length.

Condition (10) is required for miniatuarization and is associated with condition (9). When $(d_1+d_2+d_3+d_4)$ is smaller than 0.22F, the Petzval's sum is extremely increased thus making it difficult to compensate for the above described drawback in the rear lens group. Consequently, the burden placed on the fourth and fifth lenses is increased with the result that the balance in various aberrations is impaired. When $(d_1+d_2+d_3+d_4)$ is larger than 0.32F, it becomes difficult to make the overall length of the lens system within the range according to condition (7) and results in a decrease in the amount of light.

By satisfying the above described conditions, a small size, semi-wide-angle photographic lens having a sufficient backfocus and a covering angle of from ±27° to ±28° can be obtained.

Specific parameters for an example are presented below. The aberration curves resulting from this example are shown in FIGS. 2A, 2B, 2C and 2D.

EXAMPLE

| lens | radius of curvature | thickness or lens spacing | refractive index | Abbé No. |
|---|---|---|---|---|
| $L_1$ | $r_1 = 76.57$ | $d_1 = 10.16$ | $n_1 = 1.88300$ | $\nu_1 = 41.0$ |
| | $r_2 = -303.40$ | $d_2 = 6.74$ | | |
| $L_2$ | $r_3 = -53.82$ | $d_3 = 4.09$ | $n_2 = 1.68893$ | $\nu_2 = 31.1$ |
| | $r_4 = 88.06$ | $d_4 = 6.43$ | | |
| $L_3$ | $r_5 = -64.45$ | $d_5 = 2.41$ | $n_3 = 1.69895$ | $\nu_3 = 30.1$ |
| $L_4$ | $r_6 = 425.49$ | $d_6 = 7.22$ | $n_4 = 1.81600$ | $\nu_4 = 46.8$ |
| | $r_7 = -50.69$ | $d_7 = 0.24$ | | |
| $L_5$ | $r_8 = -212.57$ | $d_8 = 4.33$ | $n_5 = 1.80400$ | $\nu_5 = 46.6$ |
| | $r_9 = -68.86$ | | | |

F = 100, aperture ratio = 1:2.8, angle of view ±28°

Backfocus = 91.90 = 0.919F
$F_1$ = 70.13 = F/1.426
$F_{1,2}$ = −329.93 = −F/0.303
l = 41.62 = 0.416F
$d_1 + d_2 + d_3 + d_4$ = 27.42 = 0.274F
Petzval's sum = 0.240

What is claimed is:
1. A miniaturized semi-wide-angle photographic lens having a field of view of from ±28° and a short overall length composed of five lenses grouped in four lens components, in order from the object side to the image side, the first lens being a positive lens having its surface of greater curvature toward the object, the second lens being a double concave lens, the third lens and the fourth lens being respectively a negative lens and positive lens and together constitute a cemented doublet lens, and the fifth lens being a positive meniscus lens having its surface of greater curvature toward the image, wherein the radii of curvatue $r_1$ to $r_9$, the spacings or lens thicknesses $d_1$ to $d_8$, the refractive indecies $n_1$ to $n_5$ and the Abbe numbers $\nu_1$ to $\nu_5$ of the first through the fifth lenses $L_1$ to $L_5$ are as follows:

| lens | radius of curvature | thickness or lens spacing | refractive index | Abbé No. |
|---|---|---|---|---|
| $L_1$ | $r_1 = 76.57$ | $d_1 = 10.16$ | $n_1 = 1.88300$ | $\nu_1 = 41.0$ |
| | $r_2 = -303.40$ | $d_2 = 6.74$ | | |
| $L_2$ | $r_3 = -53.82$ | $d_3 = 4.09$ | $n_2 = 1.68893$ | $\nu_2 = 31.1$ |
| | $r_4 = 88.06$ | $d_4 = 6.43$ | | |
| $L_3$ | $r_5 = -64.45$ | $d_5 = 2.41$ | $n_3 = 1.69895$ | $\nu_3 = 30.1$ |
| $L_4$ | $r_6 = 425.49$ | $d_6 = 7.22$ | $n_4 = 1.81600$ | $\nu_4 = 46.8$ |
| | $r_7 = -50.69$ | $d_7 = 0.24$ | | |
| $L_5$ | $r_8 = -212.57$ | $d_8 = 4.33$ | $n_5 = 1.80400$ | $\nu_5 = 46.6$ |
| | $r_9 = -68.86$ | | | |

F=100, aperture ratio = 1:2.8, angle of view = ±28°

* * * * *